Jan. 2, 1951
M. H. PETERS ET AL
2,536,567
STRADDLE TYPE TRAILER CART
Filed Jan. 12, 1948
2 Sheets-Sheet 1
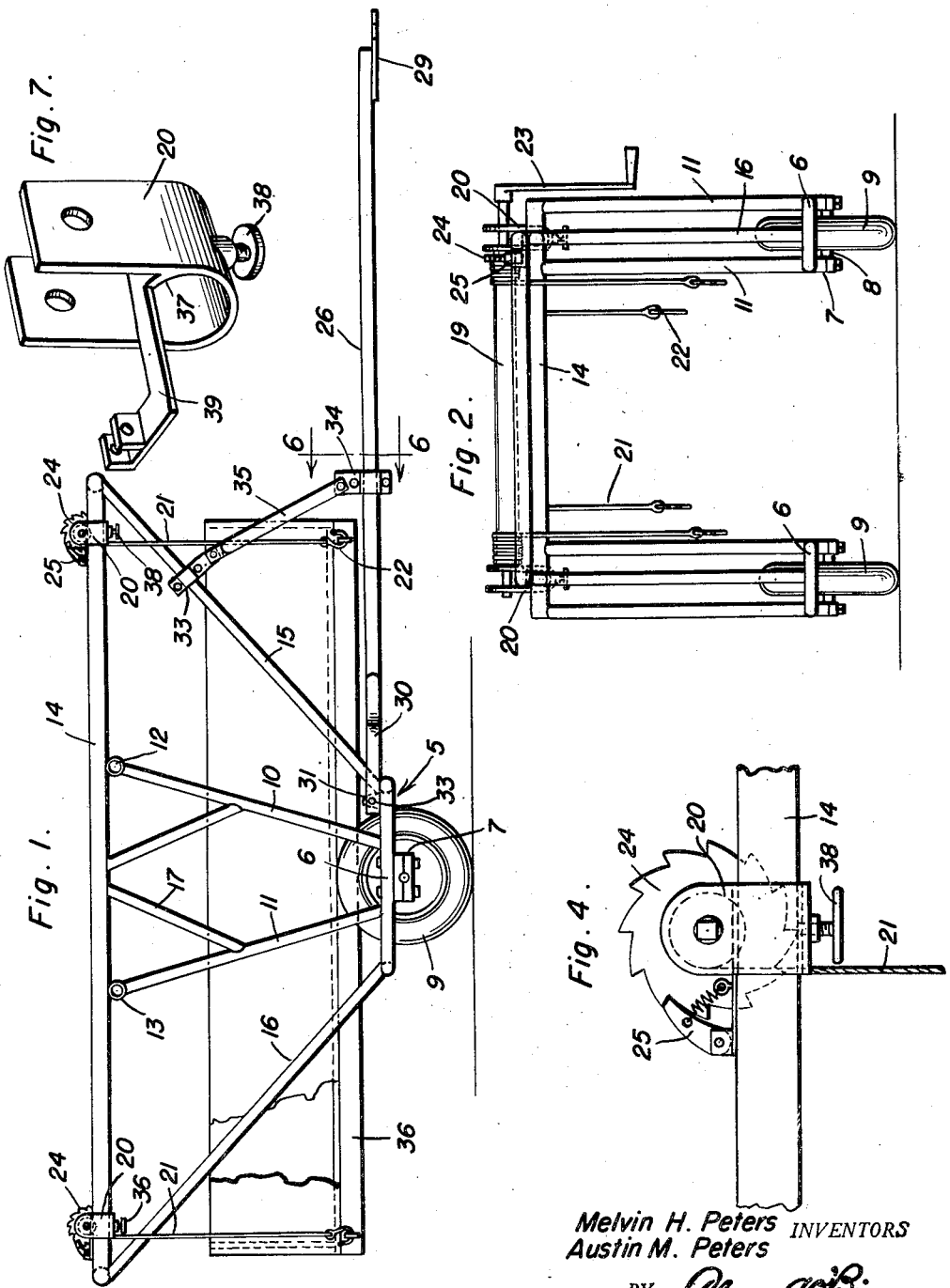
Melvin H. Peters
Austin M. Peters
INVENTORS
BY
Thomas A. O'Brien
and Harvey B. Jacobson
Attorneys Jan. 2, 1951 M. H. PETERS ET AL 2,536,567
STRADDLE TYPE TRAILER CART
Filed Jan. 12, 1948 2 Sheets-Sheet 2
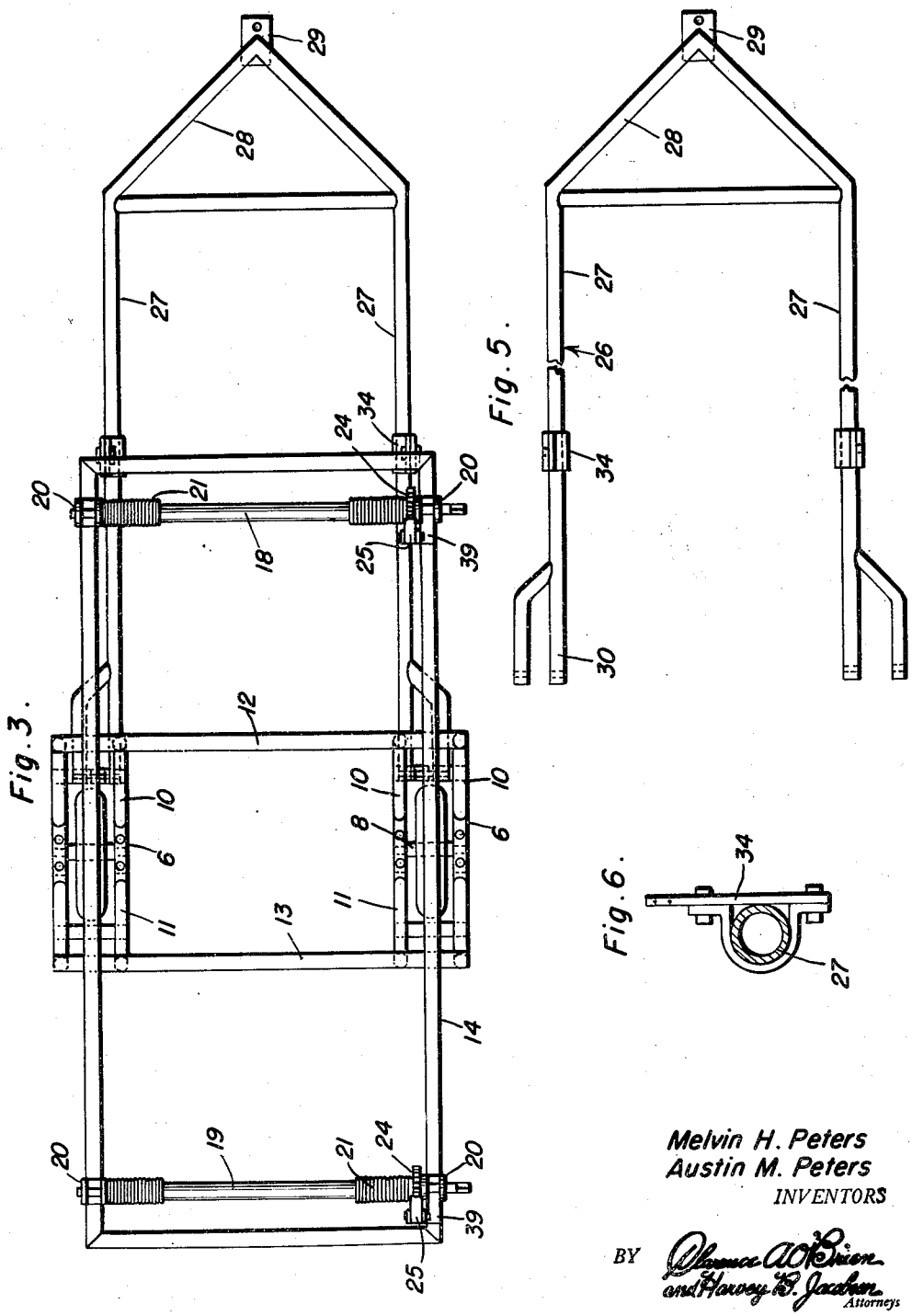
Melvin H. Peters
Austin M. Peters
INVENTORS Patented Jan. 2, 1951

2,536,567

UNITED STATES PATENT OFFICE 2,536,567

STRADDLE TYPE TRAILER CART

Melvin H. Peters and Austin M. Peters,
Montezuma, Iowa

Application January 12, 1948, Serial No. 1,703

4 Claims. (Cl. 214—75)

1

The present invention relates to new and useful improvements in trailer carts and more particularly to a straddle type trailer by means of which various types of farm machinery, disabled automobiles, poles, lumber and other material may be transported in an underslung position beneath the trailer.

An important object of the invention is to provide a trailer of this character embodying the provision of hoisting cables at the front and rear ends of the trailer by means of which various types of objects to be carried may be raised into an underslung position under the trailer for transportation thereby.

A still further object of the invention is to provide a two wheel trailer of this character including a novel frame construction and trailer tongue extending forwardly therefrom and pivotally connected to the trailer frame for vertical adjustment of the front end of the frame whereby the trailer frame may be adjusted relative to the tongue.

A still further object is to provide a device of this character of simple and practical construction, which is strong and durable, efficient and reliable in operation, relatively inexpensive to manufacture and well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a rear elevational view.

Figure 3 is a top plan view.

Figure 4 is an enlarged end view of one of the hoisting drums and showing the locking pawl and ratchet therefor.

Figure 5 is a top plan view of the trailer tongue,

Figure 6 is a fragmentary sectional view taken substantially on a line 6—6 of Figure 1 and showing the adjustable clamp for the trailer tongue, and Figure 7 is an enlarged perspective view of one of the adjustable windlass supports.

Referring now to the drawings in detail wherein for the purpose of illustration I have disclosed a preferred embodiment of the invention the numeral 5 designates the trailer frame generally and which comprises a pair of rectangular shaped wheel supporting frames 6 having bearings 7 secured to the underside thereof and in which stub axles 8 are journalled for a pair of wheels 9 mounted within the frames 6.

2

A pair of forwardly inclined posts 10 extend upwardly from each side of the wheel frames 6, adjacent the center thereof and a pair of rearwardly inclined posts 11 likewise extend upwardly from the sides of the wheel frames 6 adjacent the center thereof. A pair of transverse frame members 12 and 13 are suitably secured to the upper ends of the posts 10 and 11 at the opposite sides of the trailer and on which a substantially rectangular upper frame 14 is suitably secured. Front forwardly inclined braces 15 extend from the front end of the wheel frames 6 to the front end of the upper frame 14 and rearwardly inclined braces 16 extend from the rear end of the wheel frames 6 to the rear end of the upper frame 14. The posts 10 and 11 are suitably braced as shown at 17 with the upper frame 14.

Front and rear transversely extending drums or windlasses 18 and 19 are suitably journalled in supports 20 at the front and rear sides of the upper frame 14, each drum or windlass having a pair of cables 21 secured thereto adjacent the ends of the drum for winding thereon and provided with hooks 22 at their free ends. A detachable crank handle 23 is provided for each drum or windlass and one end of each drum or windlass is provided with a ratchet 24 and pawl 25 engageable therewith to hold the drums or windlasses against unwinding movement.

A trailer tongue designated generally at 26 includes spaced parallel longitudinally extending side members 27 converging at their forward ends as shown at 28 and provided with a coupling plate 29 for attaching to a tractor or other towing vehicle.

The rear ends of the side frames 27 of the tongue are forked as shown at 30 for straddling a lug 31 at the front end of each of the wheel frames 6 and connected thereto for vertical pivotal movement by pins 32.

A clamp 33 is secured to each of the front braces 15 for vertical adjusting movement thereon and a similar clamp 34 is secured to each of the side members 27 of the tongue 26. A connecting bar 35 has its ends pivotally connected to the clamps 33 and 34 at each side of the tongue 26 whereby to secure the tongue in a vertically adjusted position at its front end by sliding the clamps 33 and 34 respectively on the braces 15 and tongue. The front end of the trailer frame may likewise be tiltably adjusted with respect to the tongue by adjusting the clamps 33 and 34.

In the operation of the device a load to be transported by the trailer, such as a wagon box or the like 36 is straddled by the trailer by backing the trailer thereover and attaching the hooks 22 of the cables 21 to the front and rear ends of the load. The cables are then wound on the drums or windlasses 18 and 19 to raise the load into an underslung position under the upper frame 14 and the trailer, with the load supported thereon is then towed to its intended destination by a tractor or other towing vehicle.

The supports 20 are of substantially U-shaped construction having a tubular lower end 37 slidable on the longitudinal sides of the frame 14 and held in adjusted position by set screws 38 to balance a load at the center of the trailer when suspended from the cables 21.

The supports 20 at one end of the windlasses are formed with arms 39 on which the pawls 25 are pivoted.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A two wheel trailer comprising a pair of lower rectangular shaped wheel attaching frames at the sides of the trailer and having wheels journaled therein, an upper rectangular frame, struts rising from the lower frames and supporting the upper frame in an elevated position above the lower frames, said upper frame projecting forwardly and rearwardly beyond the lower frames and said struts including inclined front struts extending from the lower frames to the front end of the upper frame, hoisting means at the front and rear ends of the upper frame for hoisting a load into an underslung position between the wheel frames, a tongue pivoted to the wheel frames, and an adjustable brace slidably connected to the inclined front struts and to the tongue to secure the upper frame and tongue in tiltably adjusted position relative to each other.

2. A two wheel trailer comprising a pair of rectangular shaped wheel attaching frames at the sides of the trailer and having wheels journaled therein, an upper rectangular frame supported in an elevated position above the wheel frames, hoisting means at the front and rear ends of the upper frame for hoisting a load into an underslung position between the wheel frames, a forwardly inclined brace between each wheel frame and the front end of the upper frame, a substantially U-shaped tongue pivoted to the wheel frames and a brace having its ends adjustably connected to the inclined brace and to the tongue to tiltably adjust the front end of the trailer and tongue relative to each other.

3. In a load straddling and hoisting vehicle, an upper rectangular frame, front and rear pairs of U-shaped brackets slidably mounted on the sides of the frame, said brackets having upstanding spaced apart legs, a winch journaled in the legs of said brackets, and means securing the brackets in longitudinally adjusted position on the frame.

4. In a load straddling and hoisting vehicle, an upper rectangular frame, front and rear pairs of U-shaped brackets slidably mounted on the sides of the frame, said brackets having upstanding spaced apart legs, a winch journaled in the legs of said brackets, each winch including a pawl and ratchet, an arm on one of the brackets pivotally supporting the pawl, and means securing the brackets in longitudinally adjusted position on the frame.

MELVIN H. PETERS.
AUSTIN M. PETERS.

REFERENCES CITED

The following references are of record in the file of this patent:

UNITED STATES PATENTS

| Number | Name | Date |
|---|---|---|
| 717,951 | Tyler | Jan. 6, 1903 |
| 891,364 | Oberly | June 23, 1908 |
| 1,265,705 | Litchfield | May 7, 1918 |
| 1,609,625 | Lawes | Dec. 7, 1926 |
| 2,240,564 | Le Tourneau | May 6, 1941 |
| 2,301,994 | Atkinson | Nov. 17, 1942 |
| 2,332,326 | Lex | Oct. 19, 1943 |
| 2,404,898 | Aycock | July 30, 1946 |
| 2,444,690 | Almendinger et al. | July 6, 1948 |
| 2,448,119 | Peterson | Aug. 31, 1948 |
| 2,472,557 | Wills | June 7, 1949 |